(12) United States Patent
Jang et al.

(10) Patent No.: US 9,306,435 B2
(45) Date of Patent: Apr. 5, 2016

(54) STATOR ASSEMBLY FOR MOTOR WITH HALL SENSOR BRACKET

(71) Applicant: NEW MOTECH CO., LTD., Gwangju (KR)

(72) Inventors: Jeong Cheol Jang, Gwangju (KR); Wang Gyu Jeong, Gwangju (KR); Hee-Sang Kim, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 59 days.

(21) Appl. No.: 14/324,262

(22) Filed: Jul. 7, 2014

(65) Prior Publication Data

US 2015/0102709 A1   Apr. 16, 2015

(30) Foreign Application Priority Data

Oct. 14, 2013   (KR) .......................... 10-2013-0121734

(51) Int. Cl.
*H02K 1/18* (2006.01)
*H02K 11/00* (2006.01)

(52) U.S. Cl.
CPC .......... *H02K 11/0021* (2013.01); *H02K 11/215* (2016.01)

(58) Field of Classification Search
CPC .......... H02K 11/0073; H02K 11/0094; H02K 3/522; H02K 11/0068; H02K 1/187; H02K 11/0021

USPC ................... 310/216.105, 216.115, 216.124, 310/216.129

See application file for complete search history.

(56) References Cited

U.S. PATENT DOCUMENTS

| | | | | |
|---|---|---|---|---|
| 2002/0158542 A1* | 10/2002 | Bobay | .................... | H02K 29/08 310/254.1 |
| 2006/0063403 A1* | 3/2006 | Kataoka | ................ | H02K 3/522 439/76.2 |

FOREIGN PATENT DOCUMENTS

| | | |
|---|---|---|
| KR | 10-0301492 B1 | 9/2001 |
| KR | 10-2005-0087279 A | 8/2005 |
| KR | 20-0408923 Y1 | 2/2006 |
| KR | 10-0808194 B1 | 2/2008 |
| KR | 10-1135333 B1 | 4/2012 |
| KR | 10-1294546 B1 | 8/2013 |

* cited by examiner

*Primary Examiner* — Naishadh Desai
(74) *Attorney, Agent, or Firm* — Revolution IP, PLLC (57) ABSTRACT

Disclosed herein is a stator assembly for a motor including: a stator core which includes a rounded base having a plurality of first holes formed in the vertical direction and a plurality of teeth radially formed on the outer circumferential surface of the base; an insulation coating layer formed on the entire surface of the stator core except the inner face of the base and the periphery of the first hole; and one or more connection parts connected to the rounded base.

5 Claims, 9 Drawing Sheets

STATOR ASSEMBLY FOR MOTOR WITH HALL SENSOR BRACKET

CROSS REFERENCE TO PRIOR APPLICATIONS

This application claims priority under 35 U.S.C. §119 to Korean Patent Application No. KR 10-2013-0121734 filed on Oct. 14, 2013, which is hereby incorporated by reference in its entirety.

BACKGROUND OF THE INVENTION

1. Field of the Invention

The present invention relates to a motor. More particularly, the present invention relates to a stator of a motor which is simple in structure and can reduce manufacturing costs because it does not need to apply an insulator or an insulation film in order to insulate a teeth part of a stator core.

2. Background Art

In general, a motor includes a stator and a rotor which is located and rotated on the outer circumference or the inner circumference of the stator. The stator includes a rounded base and a stator core having a plurality of teeth which are radially formed in the outer circumferential direction or in the inner circumferential direction of the base.

In order to wind a coil on the teeth, the surface of the stator core including the teeth must be insulated. In order to insulate the surface of the stator core, an insulator made of an insulating plastic material is connected to the stator core, the surface of the stator core is insulation-coated using insulating powder, or an insulation film made of insulating resin is inserted into a slot between the teeth.

In the meantime, in case of a motor used to rotate a tub of a washing machine, in order to connect the motor having the stator to a washing machine body, a connection part protruding in the central direction is formed on the inner face of the stator. As described above, the technology to form the stator on the connection part is disclosed in Korean Patent Nos. 10-301492 (prior art reference 1), 10-0808194 (prior art reference 2), and 10-1135333 (prior art reference 3).

In case of the stator disclosed in the prior art reference 1, in order to form the connection part, connection parts are respectively formed and blanked on each of stator core sheets, and then, the stator core sheets are laminated to complete a stator core and form the connection parts.

In case of the prior art reference 2, insulators are connected to the upper and lower parts of the stator core and connection parts are formed on each of the insulators in such a manner that the connection parts are formed when the upper and lower insulators are respectively connected to the stator core.

In case of the prior art reference 3, L-shaped connection parts are attached to the inner face of the stator core, and then, insulating powder is coated on the entire surface of the stator.

However, in case of the prior art reference 1, because the connection parts must be formed on the stator core sheets, lots of electric steel sheets are required and there are a lot of scraps to be thrown out. Moreover, the prior art reference 2 can be applied to the case that the stator core sheets are laminated one by one but cannot be applied to a spiral core of a type that the stator core is wound in a spiral form.

The prior art reference 2 needs a mold for manufacturing an insulator, and is restricted in the number of windings of the coil because the size of the slot formed between the teeth is reduced by the thickness of the insulator, and hence, electromagnetic characteristics necessary for the stator may fall short of users' demands. Furthermore, the prior art reference 2 causes increase of the manufacturing costs due to an increase of the usage of plastic resin for forming the connection parts.

In case of the prior art reference 3, because the insulating powder is coated after the L-shaped connection parts are connected, the insulating powder is coated on the entire surface of the stator, and hence, it causes an increase of the usage of insulation coating. Additionally, in order to attach the L-shaped connection parts, welding is generally used, but such welding method does not guarantee a firm connection of the L-shaped connection parts.

Therefore, the inventors of the present invention propose a stator of a motor having a new structure which can solve the above-mentioned problems and can firmly connect a hall sensor assembly.

SUMMARY OF THE INVENTION

Accordingly, the present invention has been made to solve the above-mentioned problems occurring in the prior arts, and it is an object of the present invention to provide a stator assembly for a motor which is simple in manufacturing process and can reduce manufacturing costs.

It is another object of the present invention to provide a stator assembly for a motor which can connect a hall sensor assembly to a stator core more firmly.

The above and other objects, features and advantages of the present invention will be apparent from the following detailed description of the preferred embodiments of the invention in conjunction with the accompanying drawings.

To accomplish the above object, according to the present invention, there is provided a stator assembly for a motor including: a stator core which includes a rounded base having a plurality of first holes formed in the vertical direction and a plurality of teeth radially formed on the outer circumferential surface of the base; an insulation coating layer formed on the entire surface of the stator core except the inner face of the base and the periphery of the first hole; and one or more connection parts connected to the rounded base, wherein the connection part includes: an upper bracket which includes an upper bracket horizontal part, an upper bracket vertical part formed downwardly from the upper bracket horizontal part, and an upper inside connection part protruding inwardly from the stator core; and a lower bracket which includes a lower bracket horizontal part, a lower bracket vertical part formed upwardly from the lower bracket horizontal part, and a lower inside connection part protruding inwardly from the stator core and having a shape corresponding to the upper inside connection part.

In the present invention, an upper bracket connection protrusion formed on the upper bracket horizontal part is connected to the upper part of the first hole, and a lower bracket connection protrusion formed on the lower bracket horizontal part is connected to the lower part of the first hole.

Moreover, the upper bracket further includes an upper protruding connection part formed on the upper part of the upper bracket horizontal part, and the upper protruding connection part has one or more magmate insertion parts.

Furthermore, the stator assembly further includes a hall sensor assembly, and the hall sensor assembly includes: a main body part having a power supply pin inserted into the magmate insertion part; and a vertical bracket which is formed at the lower part of the main body part and which has a tooth ear insertion part.

Additionally, the stator assembly further includes a lower reinforcing rib of which an end portion is connected to the lower part of the vertical bracket and of which the other end portion is connected to a lower reinforcing bracket connection part formed on the lower bracket.

In another aspect of the present invention, there is provided a hall sensor assembly for a motor including: a main body part having one or more power supply pins; a vertical bracket which is formed at the lower part of the main body part and which includes at least one hall sensor, the vertical bracket having a tooth ear insertion part to which a tooth ear of a stator core is connected; and a lower reinforcing bracket of which an end portion is connected to the lower part of the vertical bracket.

The stator assembly for a motor according to an embodiment of the present invention is simple in manufacturing process, and can reduce manufacturing costs and connect a hall sensor assembly to a stator core more firmly.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
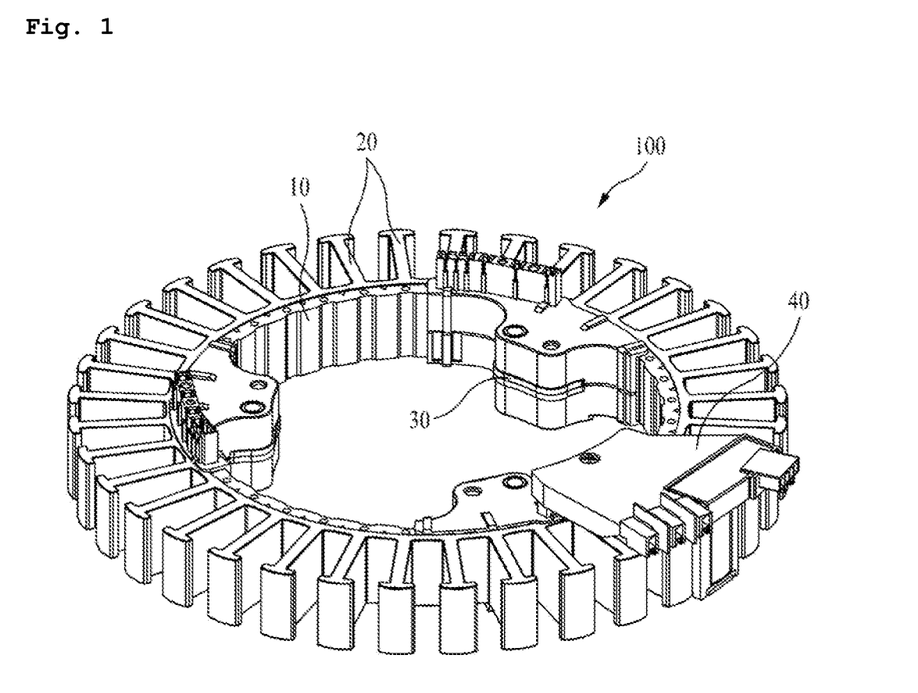
FIG. 1 is a perspective view of a stator assembly for a motor according to a preferred embodiment of the present invention.

FIG. 1 is a perspective view of a stator assembly 100 for a motor according to a preferred embodiment of the present invention.

As shown in FIG. 1, the stator assembly 100 for the motor according to the present invention includes a stator core 10, an insulation coated layer 20, connection parts 30, and a hall sensor assembly 40. A detailed description of the stator core 10 will be described with reference to FIG. 2.

Figure 2:
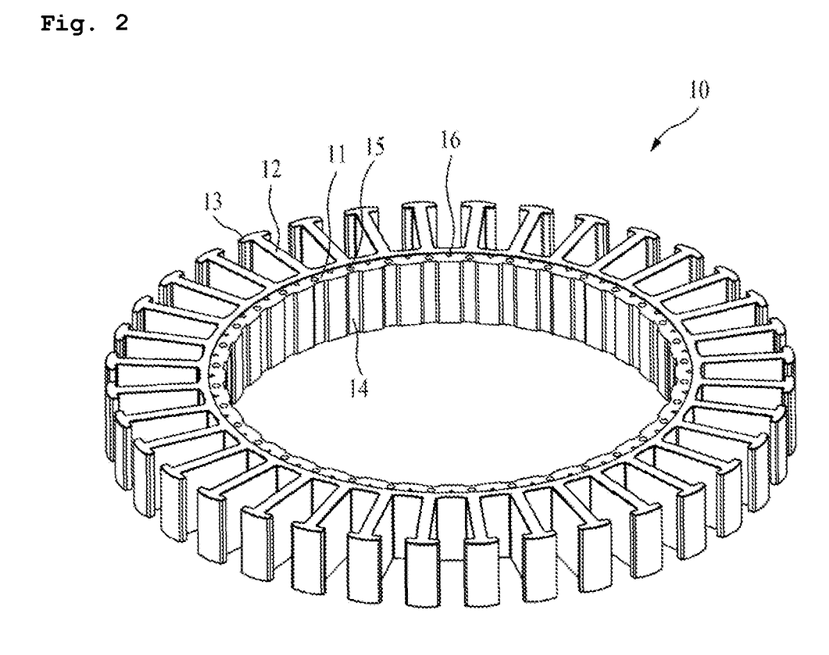
FIG. 2 is a perspective view of a stator core used to the stator assembly for the motor.

FIG. 2 is a perspective view of a stator core used to the stator assembly for the motor.

Referring to FIG. 2, the stator core 10 includes a rounded core base 11, a plurality of teeth 12 formed radially on the outer circumferential surface of the core base 11, and tooth ears 13 formed at the end of each of the teeth 12. The teeth 12 are parts where a coil (not shown) is wound. In FIG. 1, the teeth 12 is formed in the outward direction of the core base 11, but may be formed in the inward direction of the core base 11. The stator core 10 is generally manufactured in such a way as to blank and laminate a plurality of thin electric steel sheets or manufactured in a spiral type to laminate while winding up circularly.

The stator core 10 according to the embodiment of the present invention can be applied to the two manufacturing types. A plurality of guide grooves 14 are repeatedly formed in the inner face of the core base 11 of the stator core 10. The guide grooves 14 serve to guide a correct position of the connection parts 30 and guide a firm connection when the connection parts 30 are connected to the stator core 10. The number of the guide grooves 14 is not specially restricted, but the number of the guide grooves 14 must be formed at least to connect the connection parts 30, and as shown in FIGS. 1 and 2, it is also good to repeatedly form the guide grooves 14 in the inner face of the core base 11 at regular intervals.

The core base 11 has a plurality of first holes 15 and a plurality of second holes 16. The first holes 15 are formed to connect the connection parts 30 to the core base 11 of the stator core 10. The number of the first holes 15 is not specially limited, but the first holes 15 must be formed as many as it can sufficiently connect the connection parts 30, and as shown in FIGS. 1 and 2, it is also good to form the first holes 15 in the entire of the core base 11 at regular intervals.

The second holes 16 are selectively formed in the core base 11, and can be used to auxiliary strengthen the connection when the connection parts 30 or the hall sensor assembly 40 are connected. Alternatively, the second holes 16 may be used when additional parts are connected with the purpose of guiding a coil or with other purposes. The number or positions of the second holes 16 are not specially limited, but the positions and the number of the second holes 16 are formed appropriately according to needs.

Referring to FIG. 1, an insulation coating layer 20 is formed on the surface of the stator core 10.

The insulation coating layer 20 is to insulate the surface of the stator core 10, namely, to insulate between the stator core 10 and the coil when the coil (not shown) is wound on the teeth 11.

Preferably, the insulation coating layer 20 is formed by insulating resin of a powder type which is sprayed and coated on the surface of the stator core 10, but it is not limited to the above and various insulation coating methods like dipping may be applied. In this embodiment of the present invention, the insulation coating layer 20 may be also formed by a method of first coating adhesive resin to the surface of the stator core and second coating insulating resin on the surface of the coated adhesive resin. Through the above method, the insulation coating layer may have improved insulation performance and adhesive properties.

In this embodiment of the present invention, the insulation coating layer 20 is not formed on the entire surface of the stator core 10 but is formed on the entire surface of the teeth 12 and some of the surface of the core base 11. In detail, the insulation coating layer 20 is not formed on the inner face of the core base 11 and an area around the first holes 15 of the upper part and the lower part of the core base 11. In other words, the insulation coating layer 20 is coated on the part except the surface of the teeth 12 and the first holes 15 of the upper and lower parts of the core base 11. The reason is that the insides of the first holes 15 may be stopped by the coating material when the insulation coating layer is formed on the first holes 15. Because the insulation coating layer is not formed on the inner face of the core base 11, the usage of the insulation coating material can be reduced.

Figure 3:
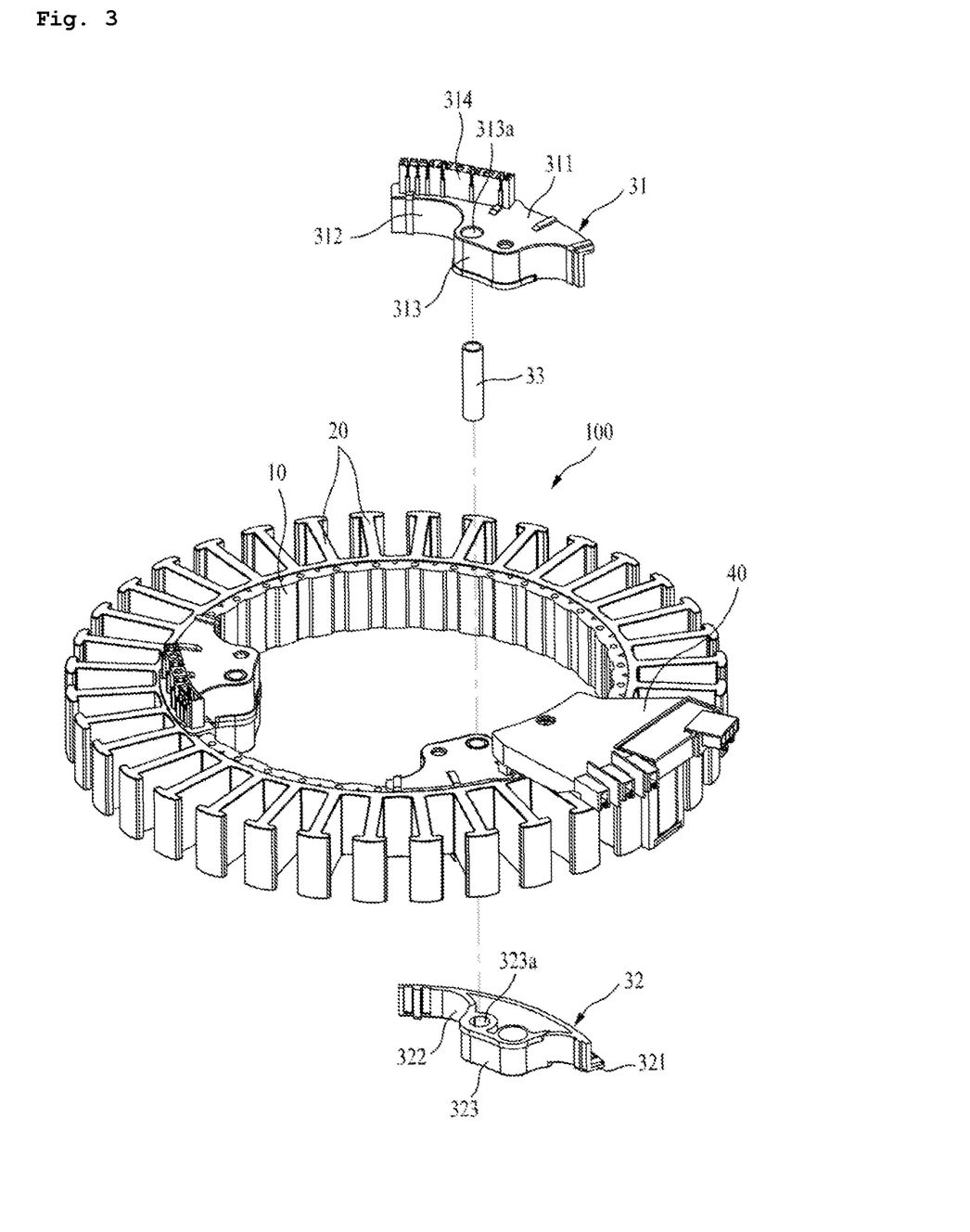
FIG. 3 is an exploded perspective view of connection parts of the stator assembly of the motor.

The connection parts 30 according to the first preferred embodiment of the present invention are formed on the inner face of the core base 11 of the stator core 10. The connection parts 30 are formed to connect the stator assembly 100 of the motor to a main body (not shown) of an electric machine, such as a washing machine, and the number of the connection parts 30 is not specially limited but it is preferable that two or more connection parts 30 be connected at the corresponding position in order to firmly connect the motor, and it is more preferable that at least three connection parts 30 be formed symmetrically as shown in FIG. 1. Referring to FIG. 3, the structure of the connection part 30 will be described in more detail.

FIG. 3 is an exploded perspective view of connection parts 30 of the stator assembly 100 of the motor.

As shown in FIG. 3, the connection part of the stator 100 according to the first preferred embodiment of the present invention includes an upper bracket 31, a lower bracket 32 and a connection bush 33.

The upper bracket 31 includes an upper bracket horizontal part 311 which comes into contact with the upper face of the core base 11 of the stator core 10 and an upper bracket vertical part 312 which comes into contact with the inner face of the core base 11. The upper bracket horizontal part 311 and the upper bracket vertical part 312 have the shape to form an upper inside connection part 313 which protrudes inwardly from the stator core 10. The lower bracket 32 includes a lower bracket horizontal part 321 and a lower bracket vertical part 322, and the lower bracket horizontal part 321 and the lower bracket vertical part 322 have the shape to form a lower inside connection part 323 which protrudes inwardly from the stator core 10. The upper inside connection part 313 and the lower inside connection part 323 are coupled to each other in a state where they are opposed to each other.

Figure 4:
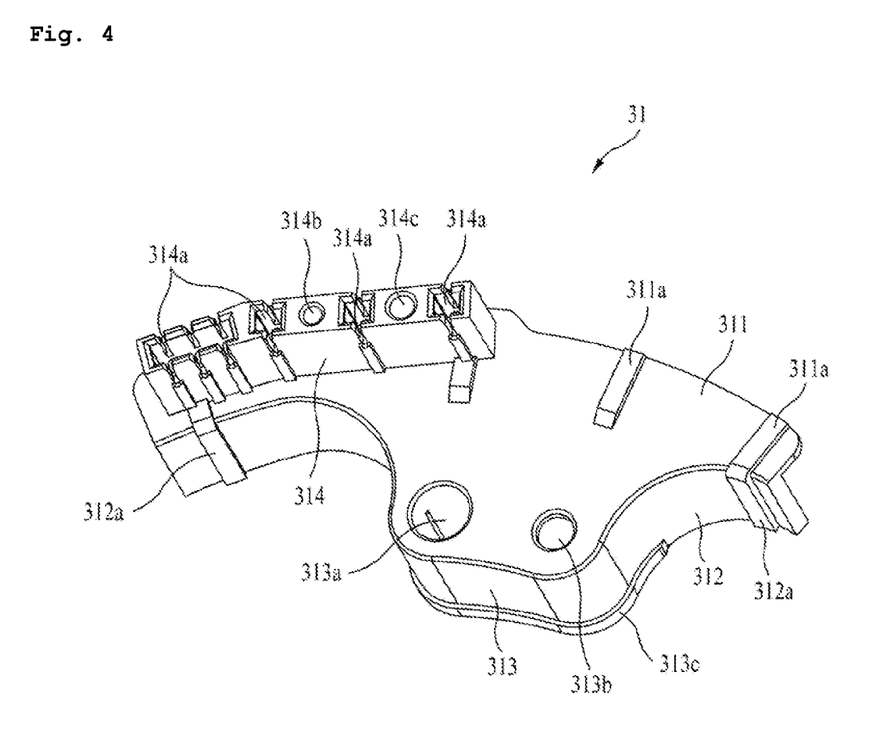
FIG. 4 is a perspective view of an upper bracket of the stator assembly of the motor.
Figure 5:
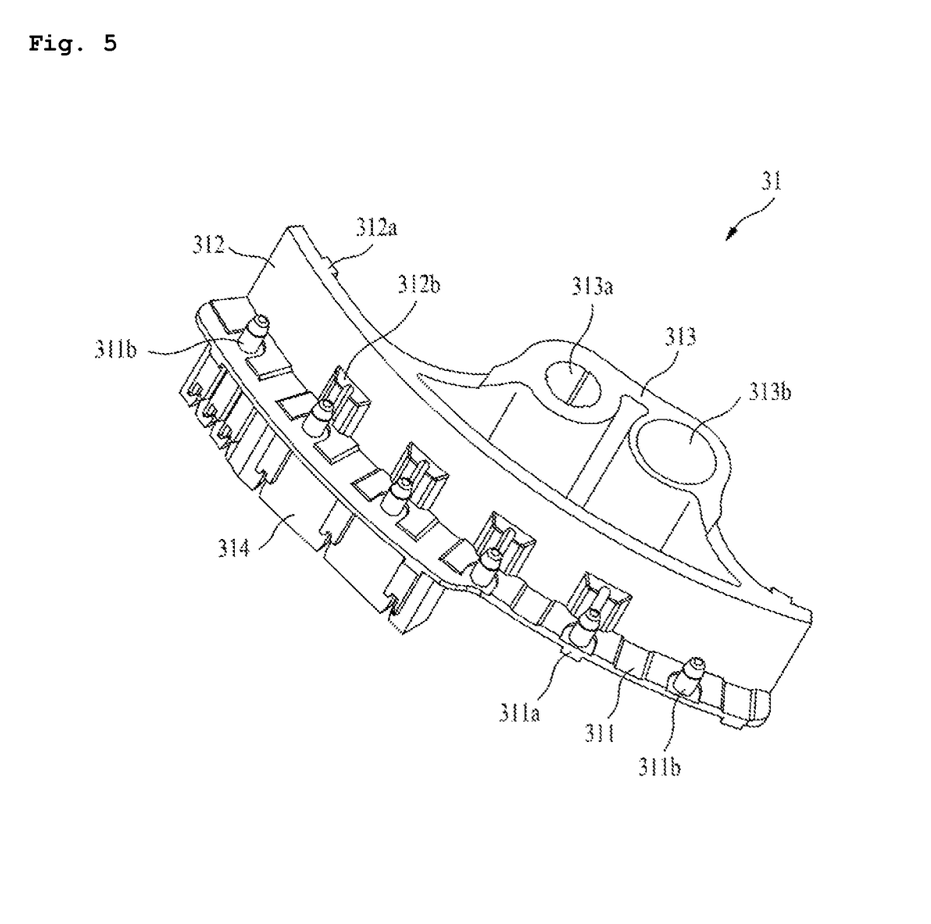
FIG. 5 is a perspective view showing a state where the upper bracket of the stator assembly is turned upside down.

When the upper inside connection part 313 and the lower inside connection part 323 are connected to the core base of the stator core 10, a first upper connection hole 313a formed in the upper inside connection part 313 and a first lower connection hole 323a formed in the lower inside connection hole 323 are opposed to each other so as to form one through hole. The connection bush 33 is inserted into the through hole, such that the upper inside connection part 313 and the lower inside connection part 323 are coupled with each other. Referring to FIGS. 4 and 5, the structure of the upper bracket 31 will be described in more detail.

FIG. 4 is a perspective view of an upper bracket of the stator assembly of the motor, and FIG. 5 is a perspective view showing a state where the upper bracket of the stator assembly is turned upside down.

As shown in FIG. 4, the upper bracket horizontal part 311 of the upper bracket 31 has one or more upper bracket horizontal reinforcing ribs 311a. The upper bracket horizontal reinforcing ribs 311a are provided to reinforce strength of the upper bracket horizontal part 311. It is preferable that the upper bracket horizontal reinforcing ribs 311a be formed in the radial direction when the upper bracket 31 is connected to the stator core 10, but the upper bracket horizontal reinforcing ribs 311a are not limited to the above and may adopt one of various shapes according to the shape of the upper bracket 31.

Referring to FIG. 5, the upper bracket horizontal part 311 has one or more upper bracket connection protrusions 311b formed on the rear side thereof. The upper bracket connection protrusions 311b are respectively inserted into the first holes 15 of the stator core 10, such that the upper bracket 31 and the stator core 10 are connected to each other.

As shown in FIGS. 4 and 5, the upper bracket vertical part 312 of the upper bracket 31 has one or more upper bracket vertical reinforcing ribs 312a. The upper bracket vertical reinforcing ribs 312a are provided to reinforce strength of the upper bracket vertical part 312. It is preferable that the upper bracket vertical reinforcing ribs 312a be formed in the vertical direction when the upper bracket 31 is connected to the stator core 10, but the upper bracket vertical reinforcing ribs 312a are not limited to the above and may adopt one of various shapes according to the shape of the upper bracket 31.

Referring to FIG. 5, the upper bracket vertical part 312 has one or more upper bracket vertical guide protrusions 312b formed on the rear side thereof. The upper bracket vertical guide protrusions 312b are respectively inserted into the guide holes 14 which are vertically formed in the inner face of the stator core 10, so as to hold the position of the upper bracket 31.

The upper inside connection part 313 has an upper inside connection hole 313a and an upper inner aligning hole 313b. When the stator assembly 100 is connected to a motor set (not shown), the upper inner aligning hole 313b is aligned at the position of an aligning protrusion formed on the motor set so as to hold a correct position of the stator assembly 100. An upper inside connection part reinforcing rib 313c formed along the outer circumference of the upper inside connection part 313 is provided to reinforce strength of a part where the upper inside connection part 313 and the lower inside connection part 323 come into contact with each other when the upper bracket 31 and the lower bracket 32 are connected with each other.

An upper protruding connection part 314 for connecting the hall sensor assembly 40 is formed on the upper part of the upper bracket horizontal part 311. The upper protruding connection part 314 includes at least one magmate insertion part 314a, a first fixing hole 314b and a second fixing hole 314c.

The magmate insertion part 314a is a place where the end of the coil (not shown) wound on the teeth 12 of the stator core 10 is joined to a magmate (not shown) to be electrically connected and to which the magmate is inserted. In case of a three-phase motor shown in FIG. 4, a three-pin magmate is applied to the leftmost magmate insertion part 314a, such that ends of three coils are electrically connected in order to form a neutral point. Three magmate insertion parts 314a which are located at the right side of the leftmost magmate insertion part are formed at predetermined intervals, and the end of the coil wound on each phase is electrically connected with a power supply terminal of the hall sensor assembly 40 in order to apply an external power source.

The first fixing hole 314b and the second fixing hole 314c are formed to connect the hall sensor assembly 40, and will be described in detail together with description of the hall sensor assembly 40 of FIG. 8.

Figure 6:
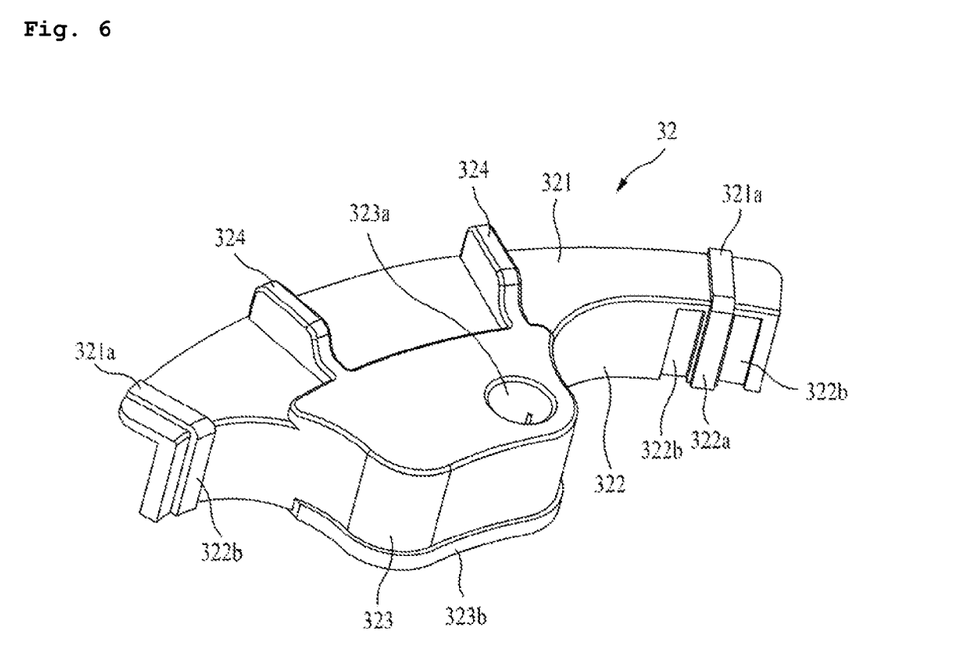
FIG. 6 is a perspective view of a lower bracket of the stator assembly of the motor.
Figure 7:
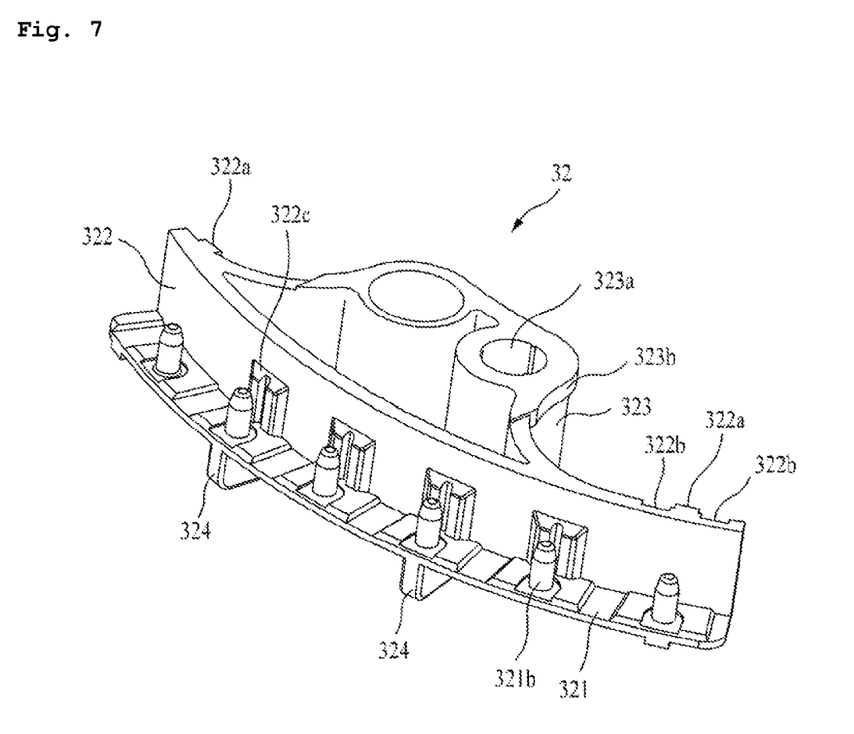
FIG. 7 is a perspective view showing a state where the lower bracket of the stator assembly is turned upside down.

FIG. 6 is a perspective view of a lower bracket of the stator assembly of the motor, and FIG. 7 is a perspective view showing a state where the lower bracket of the stator assembly is turned upside down.

As shown in FIGS. 6 and 7, the lower bracket 32 includes a lower bracket horizontal part 321, a lower bracket vertical part 322, and a lower inside connection part 323 protruding inwardly from the stator core 10 when the lower bracket 32 is connected to the stator core 10.

As shown in FIG. 6, the lower bracket horizontal part 321 of the lower bracket 32 has at least one lower bracket horizontal reinforcing rib 321a. The lower bracket horizontal reinforcing rib 321a is provided to reinforce strength of the lower bracket horizontal part 321. It is preferable that the lower bracket horizontal reinforcing rib 321a be formed in the radial direction when the lower bracket 32 is connected to the stator core 10, but the lower bracket horizontal reinforcing rib 321a is not limited to the above and may adopt one of various shapes according to the shape of the lower bracket 32.

Referring to FIG. 7, the lower bracket horizontal part 321 has one or more lower bracket connection protrusions 321b formed on the rear side thereof. The lower bracket connection protrusions 321b are respectively inserted into the first holes of the stator core 10 to the bottom, such that the lower bracket 32 and the stator core 10 are connected to each other.

As shown in FIGS. 6 and 7, the lower bracket vertical part 322 of the lower bracket 32 has one or more lower bracket vertical reinforcing ribs 322a. The lower bracket vertical reinforcing ribs 322a are provided to reinforce strength of the lower bracket vertical part 322. It is preferable that the lower bracket vertical reinforcing ribs 322a be formed in the vertical direction when the lower bracket 32 is connected to the stator core 10, but the lower bracket vertical reinforcing ribs 322a are not limited to the above and may adopt one of various shapes according to the shape of the lower bracket 32.

Figure 9:
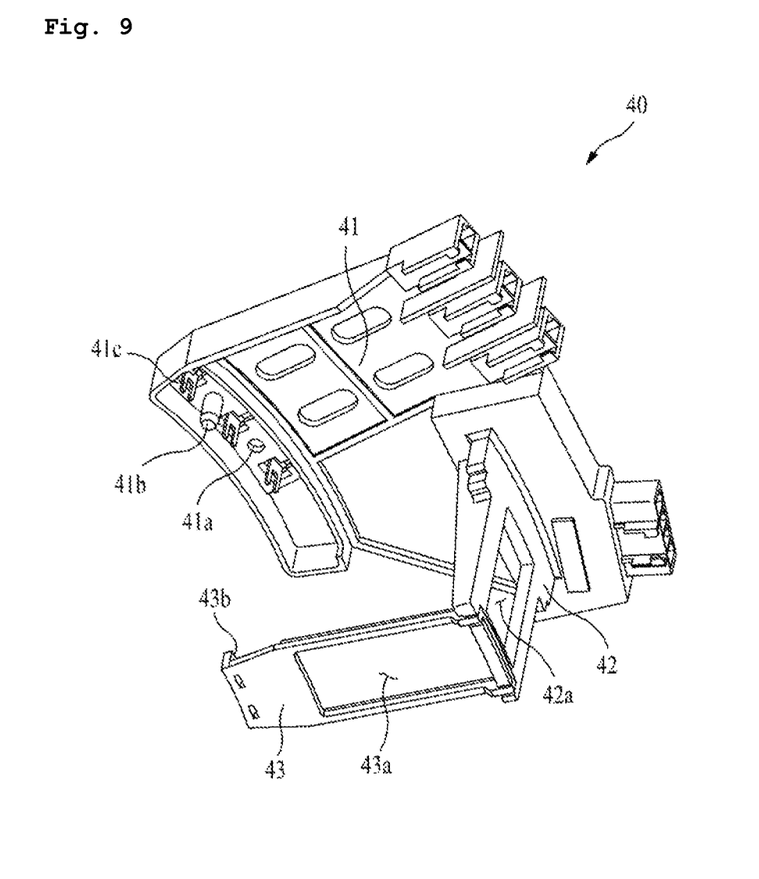
FIG. 9 is a perspective view of the hall sensor assembly connected to the stator assembly of the motor.

The lower bracket vertically part 322 may at least one lower reinforcing bracket connection part 322b, and the lower reinforcing bracket connection part 322b is a part where the lower reinforcing bracket 43 is connected in order to reinforce the connection of the hall sensor assembly 40. Referring to FIG. 9, the lower reinforcing bracket connection part 322b will be described in detail.

Referring to FIG. 7, the lower bracket vertical part 322 has one or more lower bracket vertical guide protrusions 322b formed on the rear side thereof. The lower bracket vertical guide protrusions 322b are respectively inserted into the guide holes 14 which are vertically formed in the inner face of the stator core 10, so as to hold the position of the lower bracket 32.

The lower inside connection part 323 has a lower inside connection hole 323a which comes into contact with the upper inside connection hole 313a in such a way that the connection bush 33 penetrates through the upper and lower inside connection holes 313a and 323a. The lower inside connection part reinforcing rib 323b formed along the outer circumference of the lower inside connection part 323 is formed to reinforce strength of the part where the upper inside connection part 313 and the lower inside connection part 323 when the upper bracket 31 and the lower bracket 32 are connected with each other.

At least one protruding support part 324 which protrudes upwardly is formed on the lower bracket horizontal part 321. The protruding support part 324 is higher than thickness of the coil wound on the teeth 12 of the stator core 10. In case that the stator assembly 100 is put on the floor or some components are connected toward the lower bracket 32, the protruding support part 324 prevents a damage of the stator assembly 100 when the coil directly touches the floor or gets in contact with the components.

Figure 8:
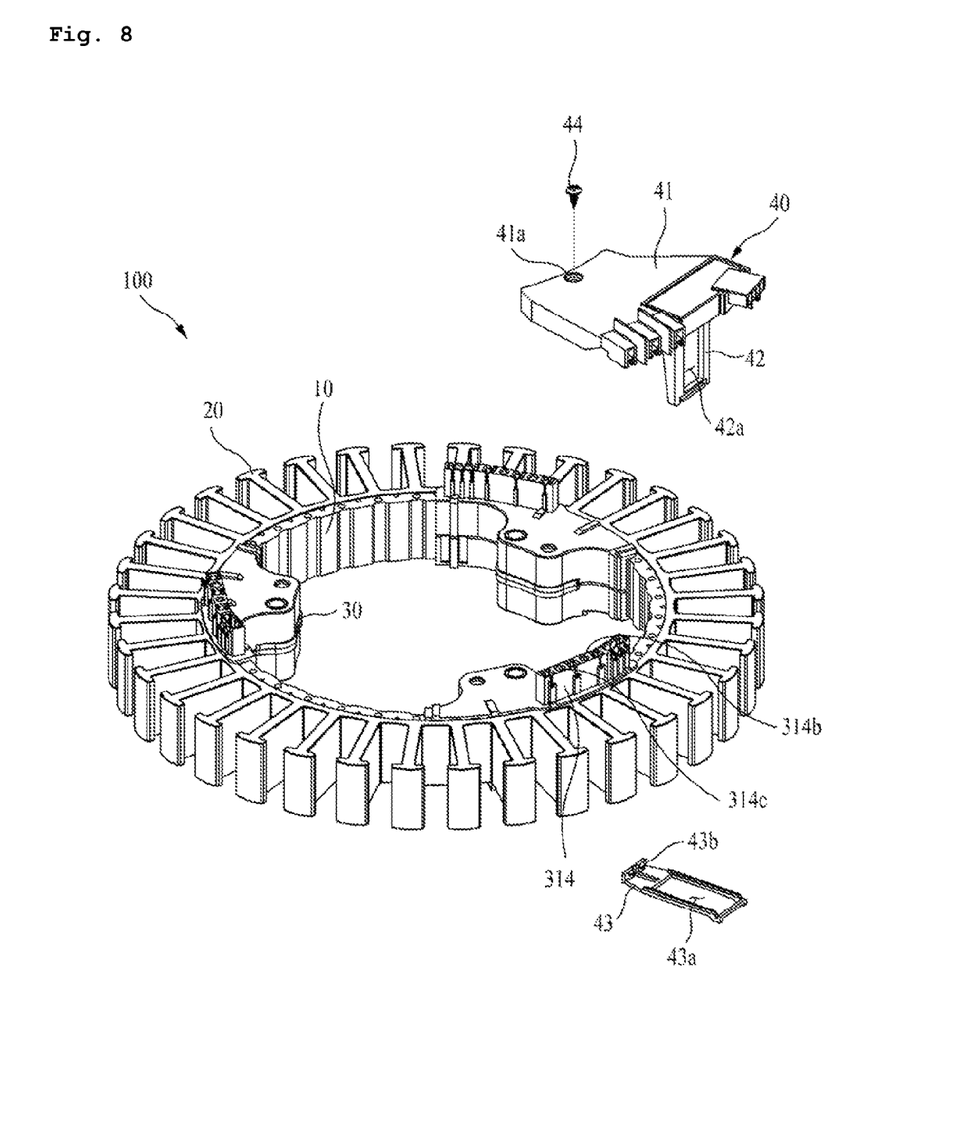
FIG. 8 is an exploded perspective view of a hall sensor assembly connected to the stator assembly of the motor.

FIG. 8 is an exploded perspective view of a hall sensor assembly connected to the stator assembly of the motor, and FIG. 9 is a perspective view of the hall sensor assembly connected to the stator assembly of the motor.

As shown in FIGS. 8 and 9, the hall sensor assembly 40 is connected to the stator assembly 100. The hall sensor assembly 40 includes a main body part 41, a vertical bracket 42 and a lower reinforcing bracket 43.

The main body part 41 includes a main body fixing hole 41a, a main body fixing protrusion 41b and a power supply terminal pin 41c formed downwardly. The main body fixing hole 41a is formed at the position corresponding to the first fixing hole 314b formed in the upper protruding connection part 314 of the upper bracket 31. Coupling means 44 such as a screw is connected to one hole formed when the main body fixing hole 41a and the first fixing hole 314b come into contact with each other, such that the main body part 41 can be firmly connected to the upper bracket 31. The main body fixing protrusion 41b is inserted and joined into the second fixing hole 314c formed in the upper protruding connection part 314. The power supply terminal pin 41c is electrically connected with the magmate of each phase which is located in the magmate insertion part 314a.

The vertical bracket 42 is in the downwardly vertical direction of the main body part 41. A tooth ear insertion part 42a formed in the vertical bracket 42 is a part to which the tooth ear 13 of the end of the tooth 12 is inserted and fixed. The lower reinforcing bracket 43 is connected to the lower part of the vertical bracket 42. The vertical bracket 42 has at least one hall sensor (not shown) therein.

The lower reinforcing bracket 43 has an opening part 43a, and a connection protrusion part 43b formed at the end thereof. The coil wound on the teeth 12 is located in the opening part 43a. The connection protrusion part 43b is connected to the lower reinforcing bracket connection part 322b formed on the lower bracket 32 by a hook connection method or one of various connection methods.

While the present invention has been described with reference to the particular illustrative embodiment, it is not to be restricted by the embodiment but only by the appended claims. It will be understood by those skilled in the art that simple modifications and changes of the embodiments within the scope of the present invention belong to the scope of the present invention.

What is claimed is:

1. A stator assembly for a motor comprising:
   a stator core which includes a rounded base having a plurality of first holes formed in the vertical direction and a plurality of teeth radially formed on the outer circumferential surface of the base;
   an insulation coating layer formed on the entire surface of the stator core except the inner face of the base and the periphery of the first hole; and
   one or more connection parts connected to the rounded base,
   wherein the connection part comprises:
   an upper bracket which includes an upper bracket horizontal part, an upper bracket vertical part formed downwardly from the upper bracket horizontal part, and an upper inside connection part protruding inwardly from the stator core; and
   a lower bracket which includes a lower bracket horizontal part, a lower bracket vertical part formed upwardly from the lower bracket horizontal part, and a lower inside connection part protruding inwardly from the stator core and having a shape corresponding to the upper inside connection part.

2. The stator assembly according to claim 1, wherein an upper bracket connection protrusion formed on the upper bracket horizontal part is connected to the upper part of the first hole, and a lower bracket connection protrusion formed on the lower bracket horizontal part is connected to the lower part of the first hole.

3. The stator assembly according to claim 1, wherein the upper bracket further includes an upper protruding connection part formed on the upper part of the upper bracket horizontal part, and the upper protruding connection part has one or more magmate insertion parts.

4. The stator assembly according to claim 3, further comprising:
   a hall sensor assembly including:
   a main body part having a power supply pin inserted into the magmate insertion part; and a vertical bracket which is formed at the lower part of the main body part and which has a tooth ear insertion part.

5. The stator assembly according to claim 4, further comprising:
a lower reinforcing rib of which an end portion is connected to the lower part of the vertical bracket and of which the other end portion is connected to a lower reinforcing bracket connection part formed on the lower bracket.

* * * * *